Feb. 18, 1958 C. E. CARNEY 2,823,463
FIXTURE FOR USE IN SHARPENING SAWS
Filed June 9, 1954
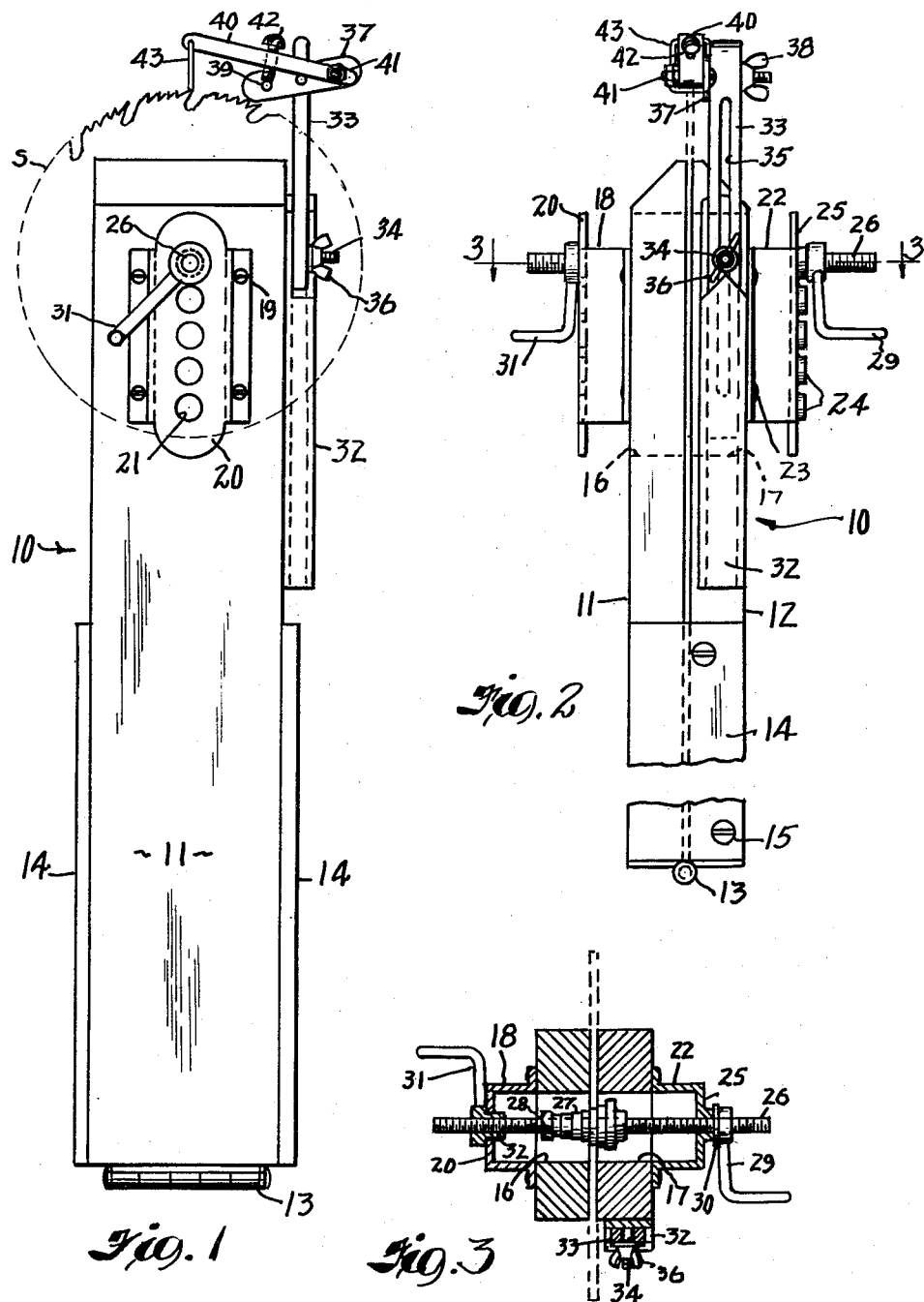
INVENTOR.
CHARLES E. CARNEY
BY
Oberlin & Limbach
ATTORNEYS.

United States Patent Office 2,823,463
Patented Feb. 18, 1958

2,823,463

FIXTURE FOR USE IN SHARPENING SAWS

Charles E. Carney, Jefferson, Ohio

Application June 9, 1954, Serial No. 435,457

7 Claims. (Cl. 33—202)

The present invention relates to an improved fixture for use in sharpening saws, and more particularly, to a device adapted accurately to gauge the teeth of a circular saw for hand filing thereof.

In order to operate with any degree of accuracy, a circular saw gauge must, when once set, maintain the desired setting relative to the saw throughout the movement of one with respect to the other which brings the gauge successively into functional relation with the several teeth of the saw. Various forms of gauges have been proposed which attach either to the arbor on which the saw is operatively mounted or to some fixed point on the sawing machine, in both cases, the operative support of the saw being used to orient the gauge and the teeth being filed without removal from the machine. However, in many instances, it is necessary or more convenient to remove the saw from its drive means in order to perform the hand filing operation, and it is a primary object of my invention to provide a relatively simple, yet reliable, gauge fixture for use in such circumstances.

It is also an object of my invention to provide a gauge fixture adapted to support a circular saw in an improved manner which affords accurate and stable orientation of the saw and gauge during the gauging and filing operations.

It is a further object to provide such a gauge fixture which readily accommodates circular saws of widely varying diameters and center openings, all such saws being accurately positioned and held in place as the several teeth thereof are individually gauged and, if necessary, filed.

An additional object is to provide a gauge fixture to be used in sharpening circular saws wherein a very simple gauge action, readily apparent to an operator, is employed so that relatively unskilled operators can successfully use the device.

Another object of the invention is to provide such a gauge fixture which includes a convenient and quick adjustment for gauging raker teeth so that the same may readily be filed, where indicated as necessary by the gauge, to the proper height relative to the cutting teeth.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a front elevational view of my improved gauge fixture for circular saws;

Fig. 2 is a side elevational view thereof; and

Fig. 3 is a horizontal sectional view taken on the line 3—3 in Fig. 2.

Referring now to the drawing in detail, the fixture illustrated comprises a support assembly indicated generally by reference numeral 10 which functions in the nature of a vise to support the saw S to be sharpened. This assembly includes two standards 11 and 12 spaced slightly apart and hingedly connected together at their bottom ends by means of a common hinge 13. The hinge connection permits the two members to be opened and closed and side plates 14 attached to the respective sides of the member 12 by means of screws 15 afford lateral stability at the lower end of the assembly by embracing the member 11 when the same is in the closed position shown.

Members 11 and 12 are provided respectively with vertically extending slots 16 and 17 in their upper portions, the two such slots being in transverse alignment. A channel member 18 is disposed against the outer surface of upright 11 to overlie the slot therein and secured in place by several screws 19. The offset center portion 20 of this channel member is provided with a plurality of holes 21 arranged in vertically spaced apart relation. A somewhat similar channel member 22 is secured by screws 23 against the outer surface of the upright 12, overlying the slot 17 of the same and located in opposition to the first such channel member 18. Channel 22 has a series of threaded openings 24 in its offset portion 25, and these openings are respectively aligned with the several holes 21 of the channel 18.

Extending transversely of the assembly and through one such pair of aligned openings of the two channels is a rod or shaft 26 threaded throughout its extent. This rod threadably engages the particular opening 24 within which it is disposed at one end and its other end passes freely through the opposite hole 21. Threaded on the rod is a stepped mandrel 27 located generally centrally thereof so as to be disposed in the area of the space between the two uprights 11 and 12. The mandrel is adapted to support the saw S by engagement of its step corresponding to the center opening of the saw in such opening. A lock nut 28 is provided to abut the reduced end of the mandrel, and it will be apparent that threading of the rod 26 in different directions through the opening 24 in which it is supported will cause the mandrel to move axially thus to locate the proper step of the same in the operative support position. At the side of the channel 22, which is the rear side of the fixture, a crank 29 is threaded on the projecting end of the rod and may be brought tightly to bear against the opening 24, a washer 30 being provided therebetween. At the other end of rod 26, a second crank 31 is provided having a boss 32 of a size to fit snugly in the hole 21 through which the rod projects.

As indicated earlier, this support structure for the saw acts in the general nature of a vise, and it will be evident that the rod 26 can be adjusted vertically to accommodate saws of widely different diameters while the axial adjustment of the mandrel affords firm support for center openings likewise of widely varying size. In order to insert a saw to be sharpened, crank 31 is removed from its end of the rod 26, crank 29 is likewise removed, and the rod then located in the particular pair of aligned openings which best locates the saw with respect to its diameter. Upright 11 is swung about its hinge connection away from upright 12 and the saw then fitted on the rod, the latter being threaded in its opening 24 so that the saw fits closely on the proper step of the mandrel. Upright 11 is then closed, the rod 26 passing through the aligned hole 21, and both cranks are replaced. With crank 29 in tightened condition, the saw can be clamped firmly by actuation of crank 31 or freed for rotation by backing off crank 31 slightly.

Turning now to the actual gauging assembly, the same comprises a slide housing 32 secured vertically to one side of the upright 12, the right side thereof as viewed in Fig. 1. A slide 33 is received in this housing and adapted adjustably to project thereabove and beyond the upper end of the support assembly. In order to hold the slide in selected adjusted position, a stationary bolt 34 projects outwardly through a slot 35 in the slide and is provided with a wing nut 36, the latter engaging the slide and locking the same against movement when tightened thereagainst. Vertical adjustment of the slide locates the upper end thereof roughly at the proper elevation above or relative to the saw teeth.

A link 37 is attached near the upper end of the slide by means of a bolt passing generally centrally through the link and transversely through the slide. A wing nut 38 is provided at the projecting rear end of such bolt to hold the link adjustably to the slide, loosening of the wing nut permitting the inclination of the slide to be adjusted for a purpose to be set forth. At the inner end of the link 37 a pin 39 is provided to project forwardly therefrom and an arm 40 is pivotally connected by means of a bolt and nut 41 at the other or outer end of the link. An adjusting bolt 42 is threaded downwardly through the arm 40 at a point such that its lower end engages and rests on the pin 39 of the link. The normal inclination of the arm can, therefore, be varied about its pivotal connection with the link by threading the bolt 42 in or out.

A loop or ring 43 is attached for free swinging motion at the elevated end of arm 40 so that the same will normally hang vertically therefrom. After the slide and hence the link and arm have been roughly adjusted vertically in the manner previously set forth, the link is adjusted more accurately to locate the bottom of ring 43 relative to the saw teeth. It will be clear that, for a given setting of the ring, all teeth of the saw of a height greater than that determined by the setting, will strike the ring as the saw is rotated and cause the same to swing. Thus there is provided a pendulum type of gauge which readily indicates excessive tooth height.

In operation of the device, the saw is properly positioned and supported on the mandrel with the gauge mechanism roughly adjusted to operative relation therewith. Crank 31 is loosened so that the saw can be rotated by hand and the teeth are successively gauged until the shortest tooth is found. This, of course, requires only that the gauge be set so that the tooth which appears on inspection be of least height just clears the ring, that is, can move past the ring without swinging of the latter, and quickly checking with this setting to make sure that no other tooth is actually of less height. With the setting of the gauge thus determined, the teeth are moved successively past the same, and if any tooth causes the ring to swing, it is filed by hand until it just clears the ring. When all teeth have been gauged and filed in this manner, the saw will have been sharpened to a true circle, tightening of crank 31 permitting the saw to be firmly clamped during the actual filing of the teeth.

Since the teeth are normally bevelled alternately at opposite sides, all teeth bevelled at one side may be first gauged and filed and, without disturbing the gauge setting, the saw reversed for gauging and filing of the alternate teeth. In this practice, the filing is all performed at one side, and it is preferred that the standard or upright 12 be suitably rigidly supported, with the insertion and filing of the saw being performed at the side of the upright 11. If the saw is provided with raker teeth, not shown in the drawing, such teeth are gauged and filed, if necessary, subsequently to insure the proper height differential between these teeth and the cutting teeth. In order that this further operation may readily be accomplished, the thread pitch of adjusting bolt 42 is such that a single revolution thereof lowers the gauge ring 43 the proper distance for gauging the raker teeth. Accordingly, it is possible for an operator, after sharpening the cutting teeth, to proceed quickly to effect any necessary filing of the raker teeth.

The simplicity and inexpensiveness of my improved fixture will readily be apparent from the foregoing. Furthermore, the pendulum action of the gauge ring provides an obvious gauge indication, the slightest swinging of the ring being readily discernible, so that there is little chance of error though the operator is relatively unskilled. Notwithstanding the simplified construction and operation, the improvements, particularly, in the support of the saw, afford accurate gauging.

Other modes of applying the principle of the invention may be employed, change being made as regards the details described, provided the features stated in any of the following claims, or the equivalent of such, be employed.

I therefore particularly point out and distinctly claim as my invention:

1. A fixture for use in sharpening a circular saw comprising two hingedly connected support members operative in the nature of a vise to hold such saw in vertical condition therebetween, a shaft extending between said support members and vertically adjustably supported thereby to pass through the center opening of the saw, a mandrel mounted on said shaft having a plurality of steps of varying diameter, means for adjusting said mandrel axially so that the step thereof corresponding in size to the saw center opening may be engaged therein, crank means operative to force and releasably hold said support members together to grip the saw as thus positioned on the mandrel, a vertical slide adjustably attached to one of said support members adapted to project above the upper end thereof, an arm adjustably mounted at the upper end portion of said slide to extend therefrom over the saw at a selected adjusted angle, and a pendulous gauge member carried by said arm, said gauge member being set by adjustment of said slide and arm to position the same relative to the teeth of the saw, the saw being freed for rotation on said mandrel by backing off said crank means, such rotation moving the teeth successively past the gauge member and any tooth projecting above the lower edge of the member striking and causing the same to swing.

2. A fixture for use in sharpening a circular saw comprising saw support means in the form of a vise having a generally horizontal stepped mandrel adapted to fit within the center opening of the saw, means for adjusting said mandrel vertically in said support means, means for further adjusting the mandrel axially, said saw support means being actuatable to grip and hold the saw stationary in one condition and to free the same for rotation in another condition, a vertical slide attached to said saw support means to project adjustably thereabove, and a pendulous gauge member carried by said slide adapted to be positioned thereby above the saw with the lower edge of the member at a selected adjusted distance from the saw axis of rotation, whereby any teeth of the saw of a greater height than that for which the gauge member is thus set strike and cause the member to swing when rotated therepast.

3. A fixture for use in sharpening a circular saw comprising a mandrel having axial portions of varying diameter adapted to fit closely within the center opening of the saw and to support the saw in vertical condition, a slide adjustably extending vertically from a fixed location relative to said mandrel, an arm mounted at the upper end portion of said slide and projecting therefrom at an adjustable angle to extend over the saw as disposed on the mandrel, said arm being connected pivotally to the slide for swinging movement about an axis substantially parallel to the axis of said mandrel, and a pendulous gauge member carried by said arm, the lower edge of said gauge member being positioned by adjustment of said slide and arm to gauge the teeth of the saw, any teeth of a height greater than that for which the gauge member is thus set striking and causing said member to swing as the saw is rotated.

4. A fixture for use in sharpening a circular saw comprising two interconnected and relatively movable support members adapted to receive and hold such saw in vertical condition therebetween, a mandrel having axial portions of varying diameter vertically adjustably supported by said support members to engage in the center opening of the saw, means for adjusting said mandrel axially as thus supported by said members, and a gauge suspended for free swinging movement adjustably above the saw, the saw being rotated to move the teeth thereof successively past the gauge.

5. A gauge for circular saws comprising a slide adapted to be vertically adjusted relative to a fixed location adjacent a vertically disposed circular saw so that it projects thereabove, a link adjustably attached to the upper end portion of said slide adapted to be disposed at a selected adjusted angle to the slide, an arm pivotally connected to said link to extend therefrom over the saw, adjustable detent means interengaging said link and arm to hold the latter in a selected position of its movement about the pivotal connection of the two, and a pendulous gauge member carried by said arm, the setting of said gauge member relative to the teeth of the saw being determined by adjustment of said slide, link and detent means, any teeth of a height greater than that for which the gauge member is thus set striking and causing said member to swing as the teeth are moved therepast by rotation of the saw.

6. A gauge for circular saws comprising a pendulous gauge member, an adjustably extensible vertical support, an arm from which said gauge member depends in free swinging relation, a mount for said arm having a pivotal connection to said vertical support, and pivotal attaching means connecting said arm to said mount for swinging movement about an axis in spaced relation to the axis of the pivotal connection of the mount and the support, the gauge member being set by adjustment of the slide and mount to hang to a predetermined point with respect to the saw being gauged, whereby any teeth thereof projecting above such point as the saw is rotated therepast strike and cause the gauge member to swing.

7. A gauge for circular saws comprising a slide adapted to be vertically adjusted relative to a fixed location adjacent a vertically disposed circular saw so that it projects thereabove, a link adjustably attached to an upper end portion of said slide and adapted to be disposed at a selected adjusted angle to the slide, an arm pivotally connected to said link and extending therefrom for positioning over the saw, a detent on said link, screw-threaded adjusting means carried by said arm in engagement with said detent, actuation of said screw-threaded adjusting means shifting the angular disposition of the arm about its pivotal connection in ascertainable fixed increments, and a pendulous gauge member carried by said arm, the setting of the gauge member relative to the teeth of the saw being determined by adjustment of said slide, link and screw-threaded means, any teeth of a height greater than that for which the gauge member is thus set striking and causing said member to swing as the teeth are successively moved therepast by rotation of the saw.

References Cited in the file of this patent

UNITED STATES PATENTS

| | | |
|---|---|---|
| 616,305 | Fernside | Dec. 20, 1898 |
| 905,924 | Reynolds | Dec. 8, 1908 |
| 945,217 | Brown | Jan. 4, 1910 |
| 1,784,160 | Remond | Dec. 9, 1930 |
| 1,924,171 | Tesch | Aug. 29, 1933 |
| 1,936,828 | Clement et al. | Nov. 28, 1933 |
| 2,035,880 | Goodale | Mar. 31, 1936 |
| 2,657,594 | Frazier | Nov. 3, 1953 |
| 2,682,114 | Ames et al. | June 29, 1954 |